Nov. 19, 1968     D. R. SMITH     3,411,616
CIGAR OVERWRAPPING AND BANDING MACHINE
Filed July 26, 1965     14 Sheets-Sheet 1

FIG. 1

INVENTOR.
Dale R. Smith
BY
Paul & Paul
ATTORNEYS.

Nov. 19, 1968   D. R. SMITH   3,411,616
CIGAR OVERWRAPPING AND BANDING MACHINE
Filed July 26, 1965   14 Sheets-Sheet 8

INVENTOR.
Dale R. Smith,
BY
Paul & Paul
ATTORNEYS.

Nov. 19, 1968     D. R. SMITH     3,411,616

CIGAR OVERWRAPPING AND BANDING MACHINE

Filed July 26, 1965     14 Sheets-Sheet 9

FIG-11

INVENTOR.
Dale R. Smith,
BY
Paul & Paul
ATTORNEYS.

Nov. 19, 1968    D. R. SMITH    3,411,616
CIGAR OVERWRAPPING AND BANDING MACHINE
Filed July 26, 1965    14 Sheets-Sheet 11

INVENTOR.
*Dale R. Smith,*
BY
*Paul & Paul*
ATTORNEYS.

FIG-16

Nov. 19, 1968 D. R. SMITH 3,411,616
CIGAR OVERWRAPPING AND BANDING MACHINE
Filed July 26, 1965 14 Sheets-Sheet 14

FIG-18

INVENTOR.
Dale R. Smith,
BY
Paul & Paul
ATTORNEYS.

United States Patent Office 3,411,616
Patented Nov. 19, 1968

3,411,616
CIGAR OVERWRAPPING AND BANDING
MACHINE
Dale R. Smith, York, Pa., assignor to York Production
Engineering Co., Inc., Windsor, Pa., a corporation of
Pennsylvania
Filed July 26, 1965, Ser. No. 474,754
9 Claims. (Cl. 198—218)

ABSTRACT OF THE DISCLOSURE

A cigar overwrapping and banding machine is disclosed in which a square-motion finger rack is employed to advance cigars, in a steady stream in spaced-apart relation to each other and without rolling, over an infeed platform, from which the cigars are successively elevated to the higher level of a discharge platform. A square-motion transfer mechanism transfers the cigars to the discharge platform over which the cigars are then advanced by the square-motion finger rack in a steady stream in spaced-apart relation without rolling. Wrapping of the cigar begins at the elevator position.

---

The present invention relates generally to improvements in machines for wrapping cigars and particularly to improvements in a cigar overwrapping and banding machine.

The invention claimed in this application is directed to square motion finger rack means for advancing the cigars along infeed and discharge platforms, and to the elevator means for raising the cigars one at a time from the infeed to the discharge platforms, and to square motion transfer mans for transferring the cigars one at a time from the elevator means to the discharge platform.

Four divisional applications, Ser. Nos. 706,726, 706,-727, 706,728, and 706,729, filed Oct. 4, 1967, contain further disclosure originally contained in this application directed to various features of the cigar wrapping and sealing mechanisms.

An object of the invention claimed in the present application is to provide a cigar wrapping machine with means for advancing the cigars in a steady stream thereof over an infeed platform without rolling the cigars, successively elevating the cigars from the infeed platform to the higher level of a discharge platform and advancing the cigars in a steady stream thereof over the discharge platform without rolling them.

Another object is to provide such a machine wherein the cigars are advanced over the infeed and discharge platforms in contact therewith and in spaced relation to each other.

Other objects of the invention will become apparent when the following description is read with reference to the accompanying drawings, wherein:

The following description is directed to the specific from of the invention shown in the drawings. It is not addressed to the scope of the invention, which may be practiced in a variety of forms.

Figure 1:
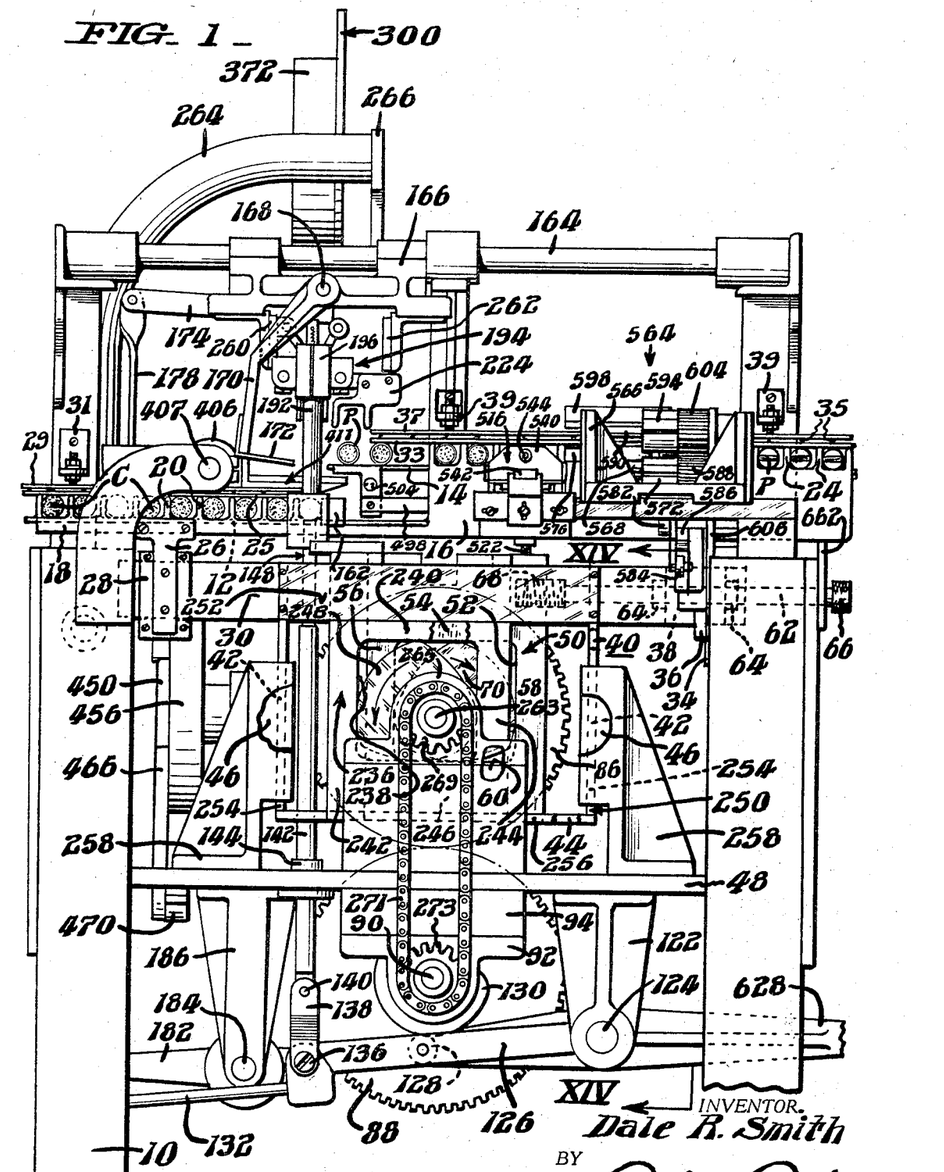
FIGURE 1 is a front elevation of the cigar overwrapping and banding machine, showing the machine at the end of a cigar advancing cycle.
Figure 2:
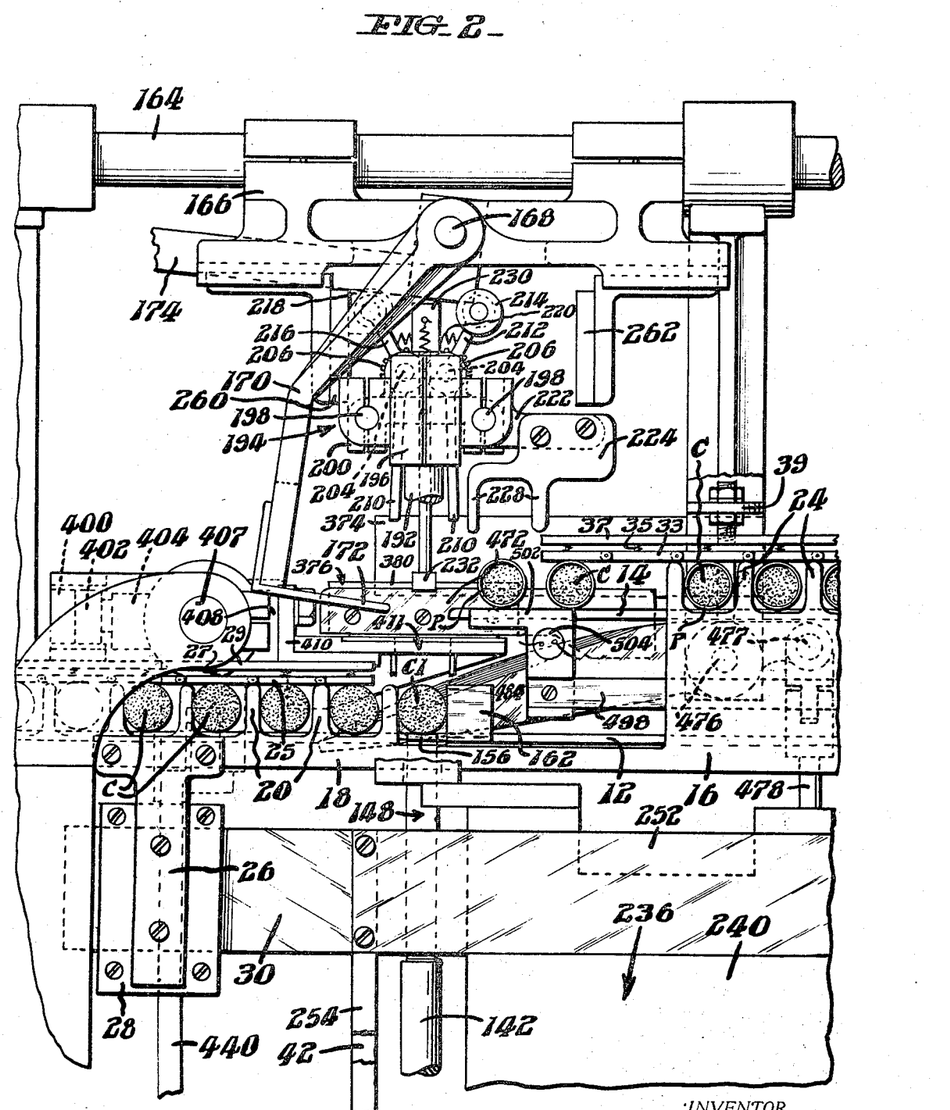
FIGURE 2 shows an area of FIGURE 1 to an enlarged scale.
Figure 3:
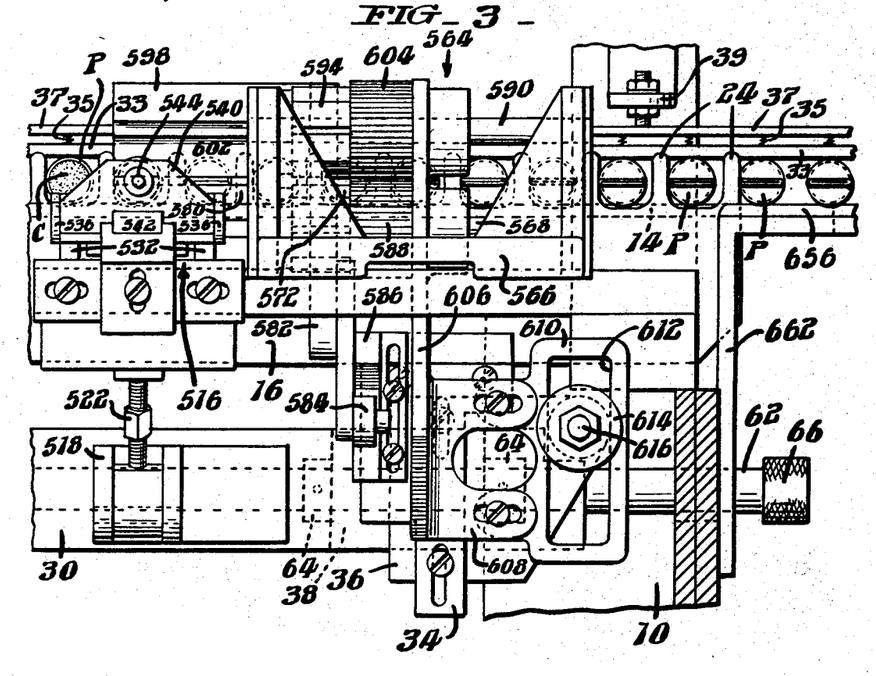
FIGURE 3 shows an area of FIGURE 1 to an enlarged scale, but with the end sealing unit in retracted position.
Figure 12:
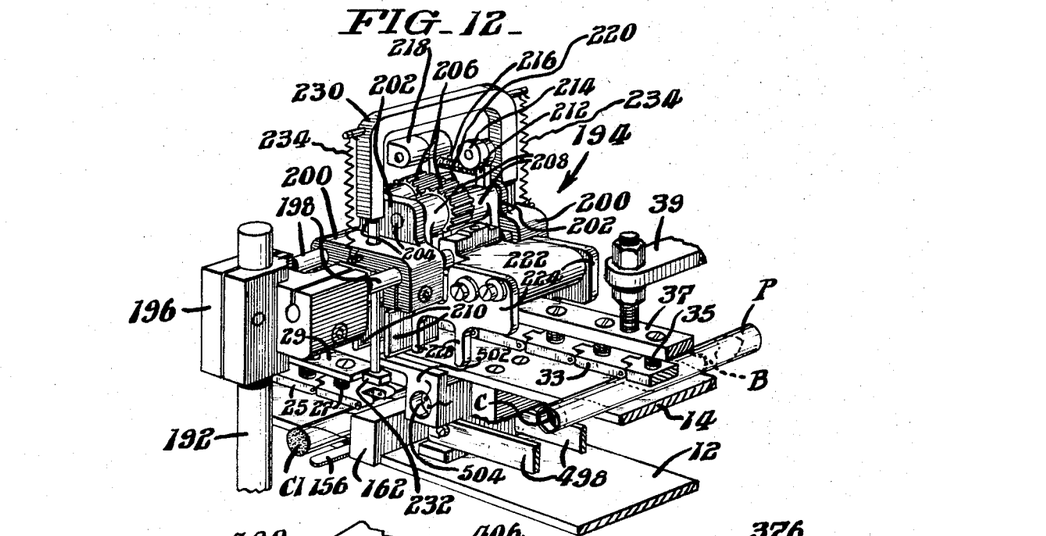
FIGURE 12 is a fragmentary perspective view of the machine.
Figure 13:
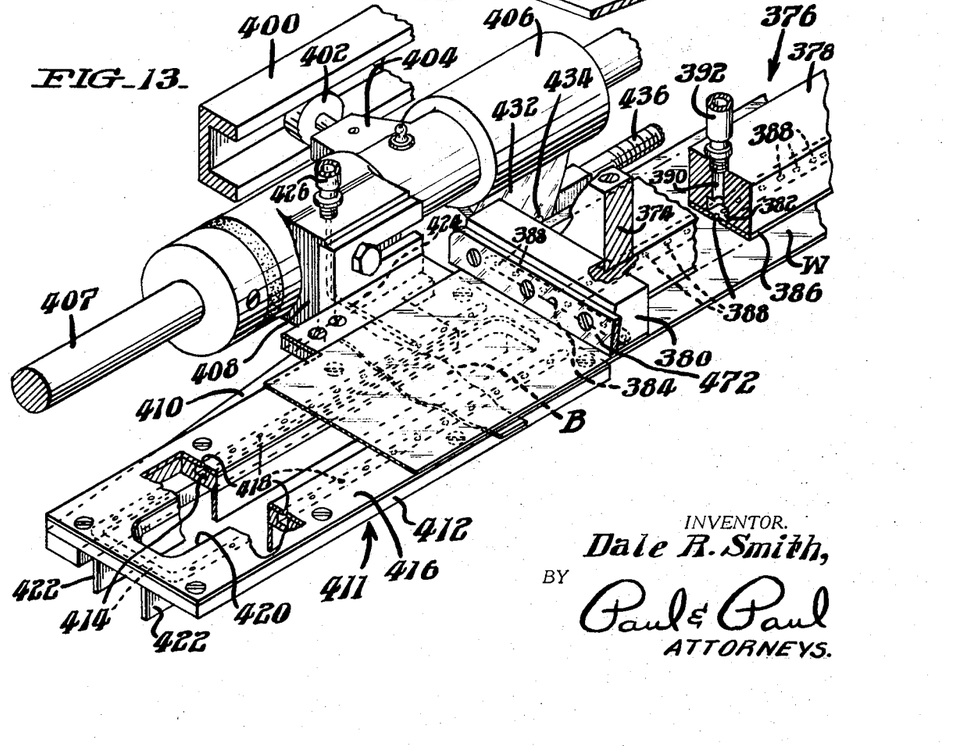
FIGURE 13 is a fragmentary perspective view of mechanism for controlling the leading end of the cellophane web.

Referring particularly to FIGURES 1, 2 and 12, the cigar overwrapping and banding machine comprises a rigid, floor-supported frame 10 mounting a horizontally extending infeed platform 12, and a horizontally extending discharge platform 14 disposed at an elevation higher than that of the infeed platform 12. Disposed respectively upon opposite sides of the infeed platform 12 and the discharge platform 14 are a pair of laterally spaced, horizontally extending racks 16. The infeed sections of the racks, designated 18, are provided with upright, equally spaced fingers 20, and the discharge sections of the rack are provided with upright, equally spaced fingers 24. Extending across the infeed and discharge platforms are cigars C having opposite end portions overhanging the platform and disposed between the fingers of the racks. Over the infeed platform extends a hold-down link chain 25 suspended from a series of compression springs 27 carried by a bar 29 which is affixed to the frame of the machine by means of brackets 31. Extending over the discharge platform is a hold-down link chain 33 suspended from a series of compression springs 35 carried by a bar 37 affixed to the frame of the machine by brackets 39.

Referring particularly to FIGURES 1, 3, 7 and 16, at the infeed end of the machine each rack 16 is affixed to a plate 26 which overlies a plate 28. The plate 28 in turn overlies a horizontally extending plate member 30. Disposed between the plate members 30 is a block 32 recessed for sliding along the plate members 30. The plate member 28 is affixed to the block 32. At the discharge end of the machine each rack 16 is affixed to a plate 34 which overlies a plate 36. Disposed between the plate members 30 is a block 38 recessed for sliding along the plate members 30. The plate 36 is affixed to the block 38. The plate members 30 form horizontally extending upper members of a rectangular frame 40 which is provided with laterally spaced upright opposite side members 42 and a horizontally extending lower member 44. The members 42 are slidably received respectively in a pair of brackets 46 which are mounted upon a horizontally extending plate 48 forming a part of the frame 10.

Figure 16:
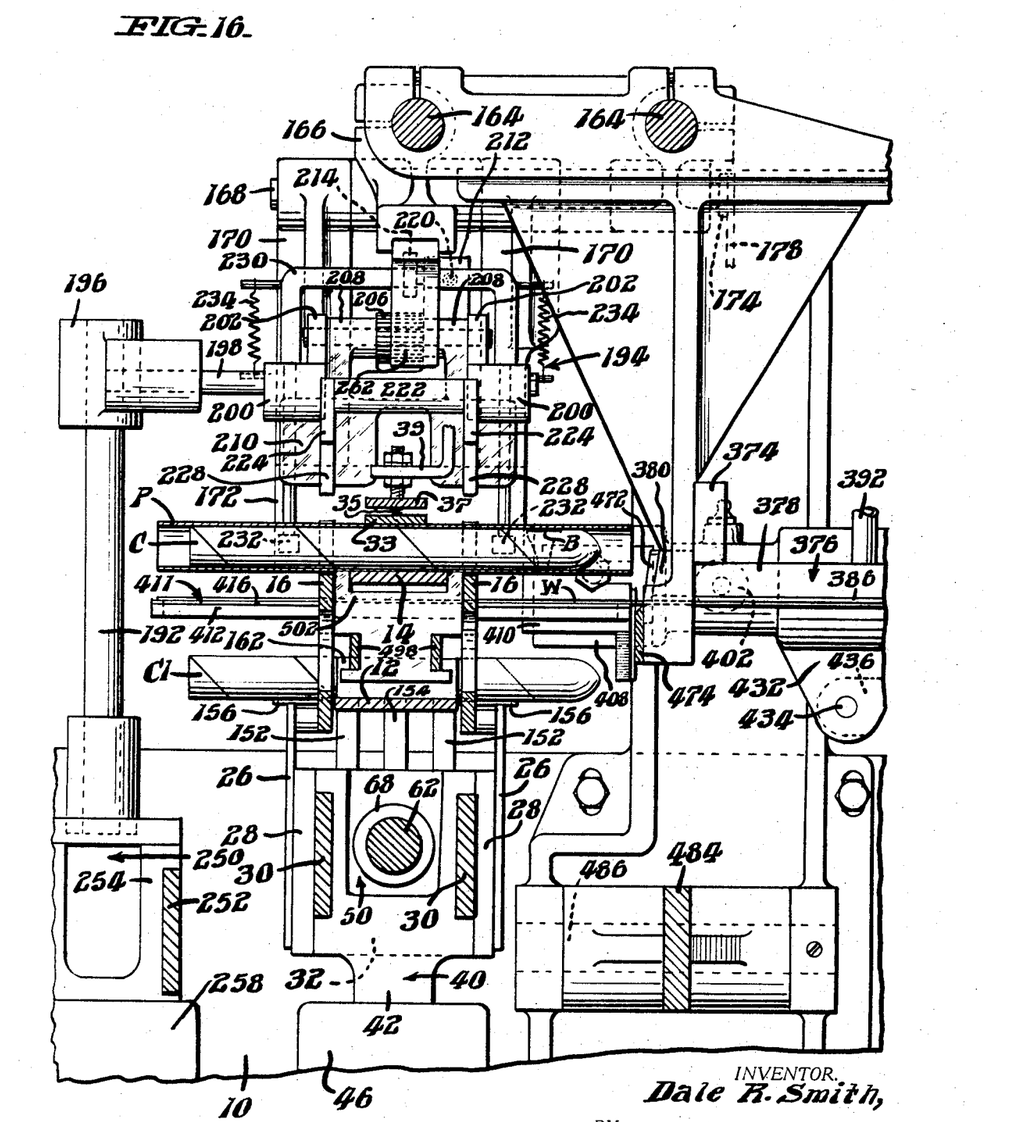
FIGURE 16 is a fragmentary, vertical, longitudinal section through the machine.
Figure 17:
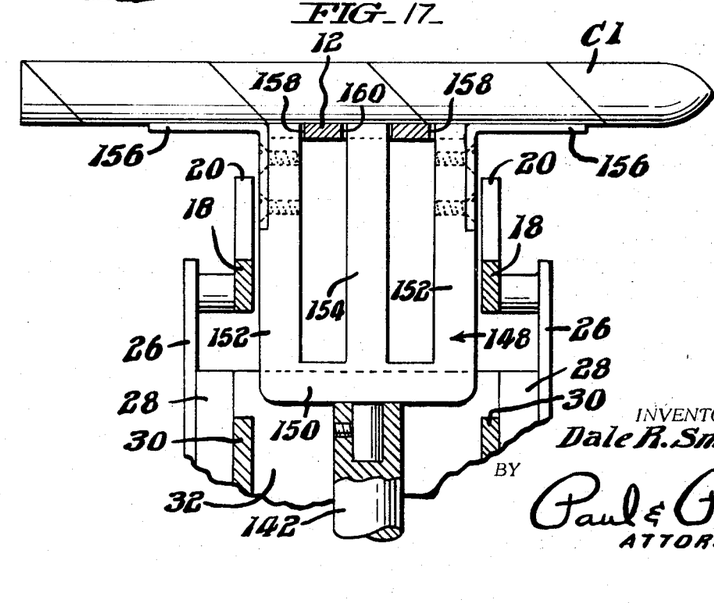
FIGURE 17 is an enlarged view on line XVII—XVII of FIGURE 9.
Figure 18:
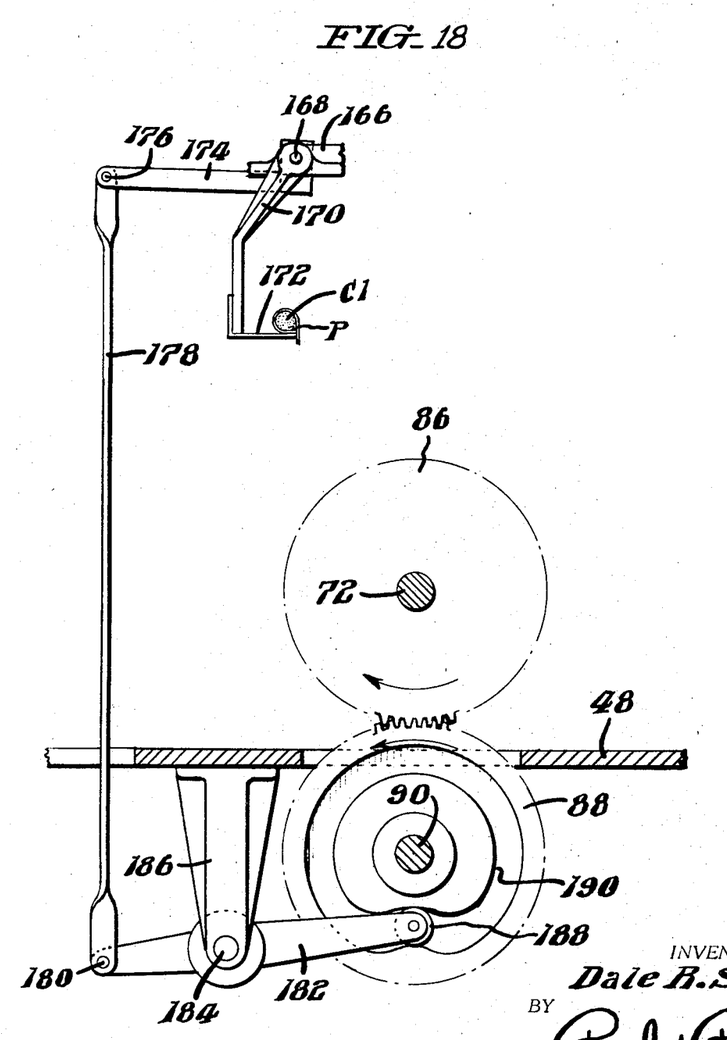
FIGURE 18 is a section on line XVIII—XVIII of FIGURE 14.

Referring particularly to FIGURES 1 and 16, within the frame 40 is a cam follower frame, generally designated 50. The frame 50 is provided with a large rectangular opening 52 defined by a horizontally extending upper member 54, laterally spaced upright opposite side members 56 and 58 and a horizontally extending lower member 60. The member 54 of the frame is recessed for sliding along the plate members 30, and the member 60 is recessed for sliding along the member 44 of the frame 40. Threaded into one side of the frame 50, as at 68, is a rod 62 which extends freely through the block 38. The opposite end of the rod 62 is provided with a knob 66. Fitted over the rod 62 and affixed thereto are a pair of collars 64 disposed respectively on opposite sides of the block 48.

Figure 14:
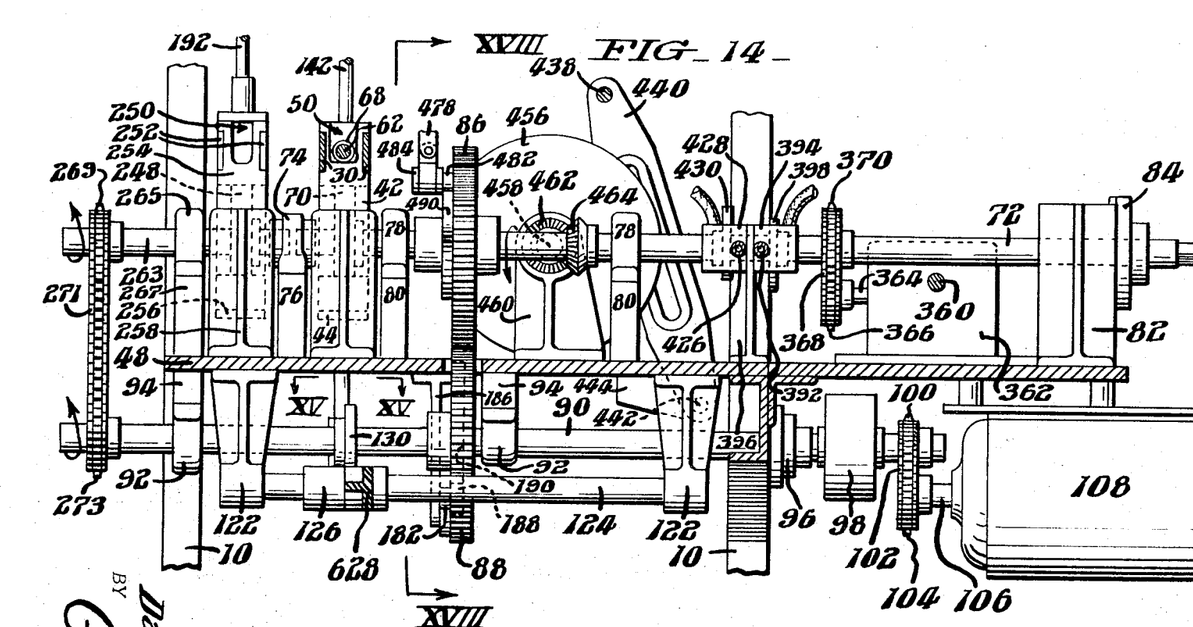
FIGURE 14 is a section on line XIV—XIV in FIGURE 1.
Figure 15:
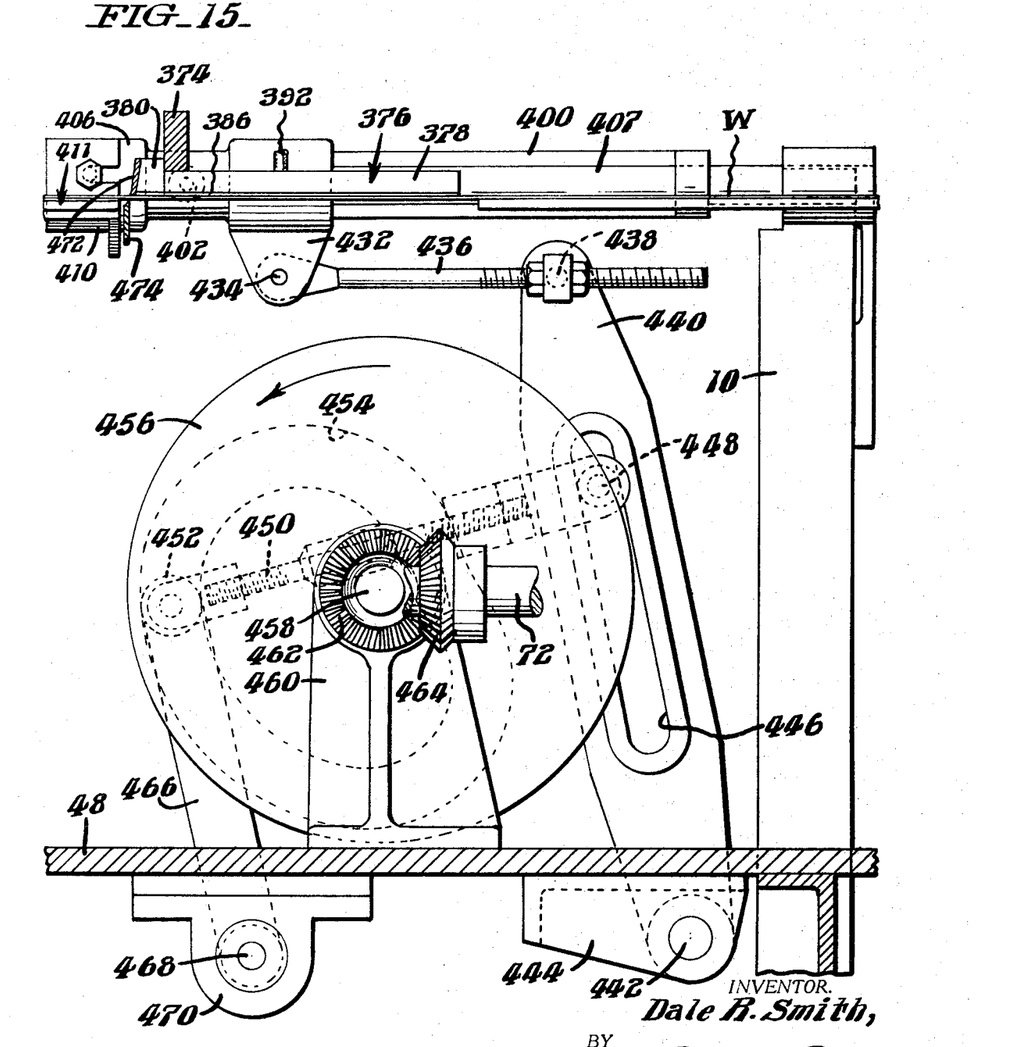
FIGURE 15 shows an area of FIGURE 14 to an enlarged scale.

Referring particularly to FIGURES 1 and 14, disposed within the square opening 52 of the frame 50 is a cam 70 of a shape for actuating and positively controlling movement of the frame. The cam 70 is mounted upon a cam shaft 72 which is journaled in a bearing 74 carried by a block 76, a pair of bearings 78 carried by blocks 80, and a bearing 84 carried by a bracket 82.

Referring particularly to FIGURE 14, the shaft 72 mounts a spur gear 86 which meshes with a spur gear 88 of the same size mounted upon a drive shaft 90. The shaft 90 is journaled in a pair of bearings 92 carried by blocks 94 and in a bearing 96 carried by the frame 10. Mounted on the shaft 90 is a magnetic clutch 98 and a driven sprocket 100. Trained over the sprocket 100 is a drive chain 102 which is also trained over a drive sprocket 104. The sprocket 104 is mounted upon the output shaft 106 of a reducer, designated 108. This input shaft of the reducer, designated 110, mounts a driven sprocket 112. Trained over the sprocket 112 is a drive chain 114 which is also trained over a drive sprocket 116 mounted upon the output shaft 118 of a motor 120.

The motor 120 actuates the drive chain 114 and the reducer 108 in turn actuates the drive chain 102. When the magnetic clutch 98 is engaged, drive chain 102 actuates drive shaft 90, and through gears 88 and 86 cam shaft 72 and cam 70 are rotated at the same rate as drive shaft 90.

Figures 4, 5:
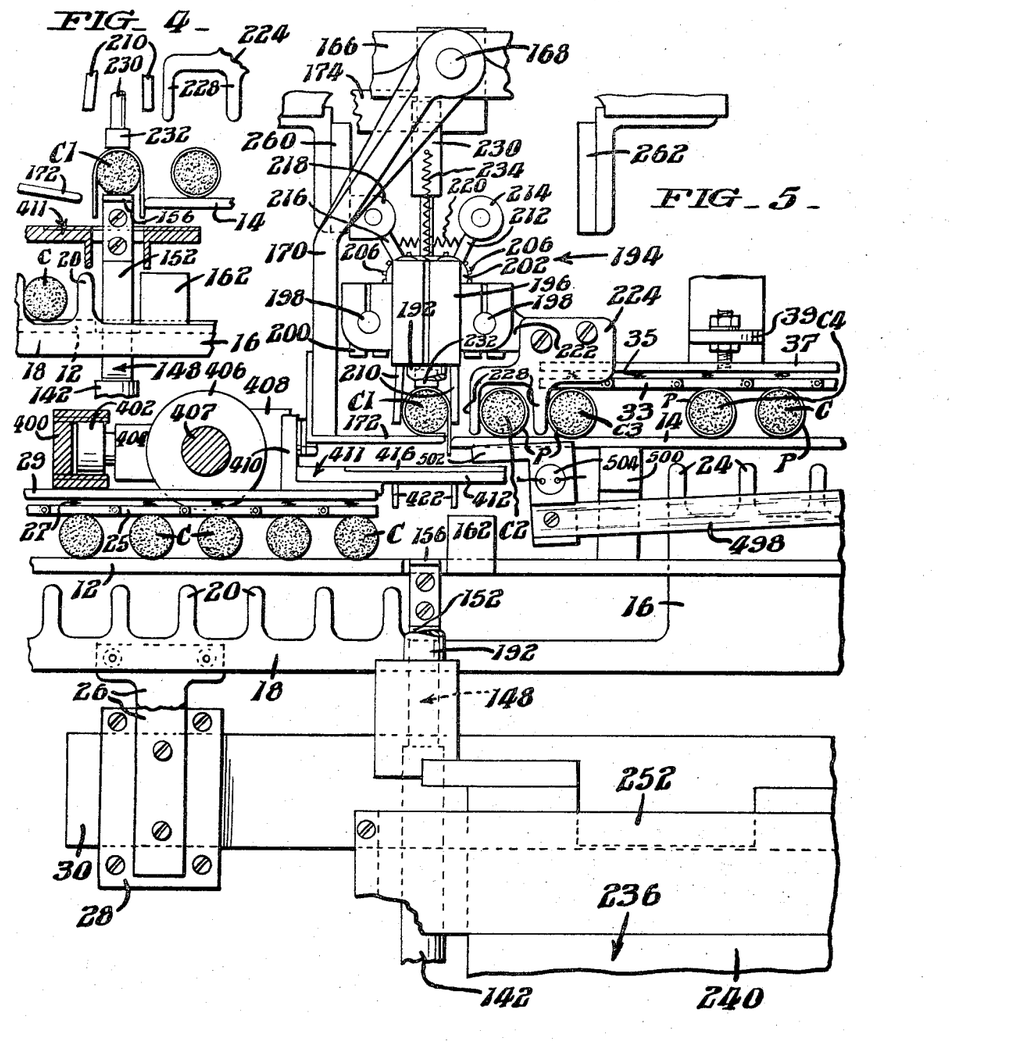
FIGURE 4 is a view showing a cigar with a wrapper draped thereover and elevated from the position shown in FIGURES 1 and 2.
FIGURE 5 is a view showing one side of the wrapper being folded under the cigar.
Figure 6:
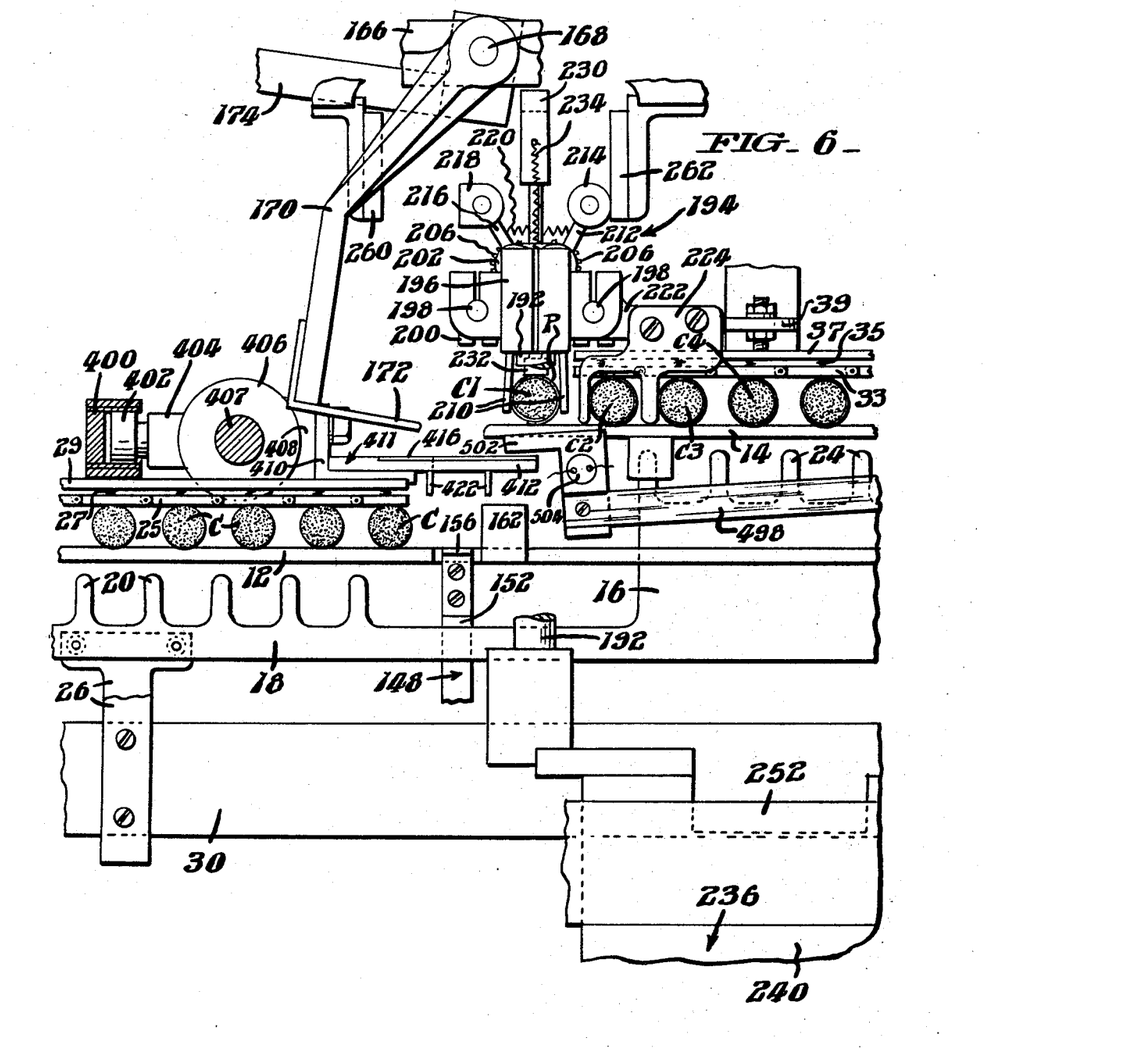
FIGURE 6 is a view showing the other side of the wrapper being folded under the cigar.
Figure 7:
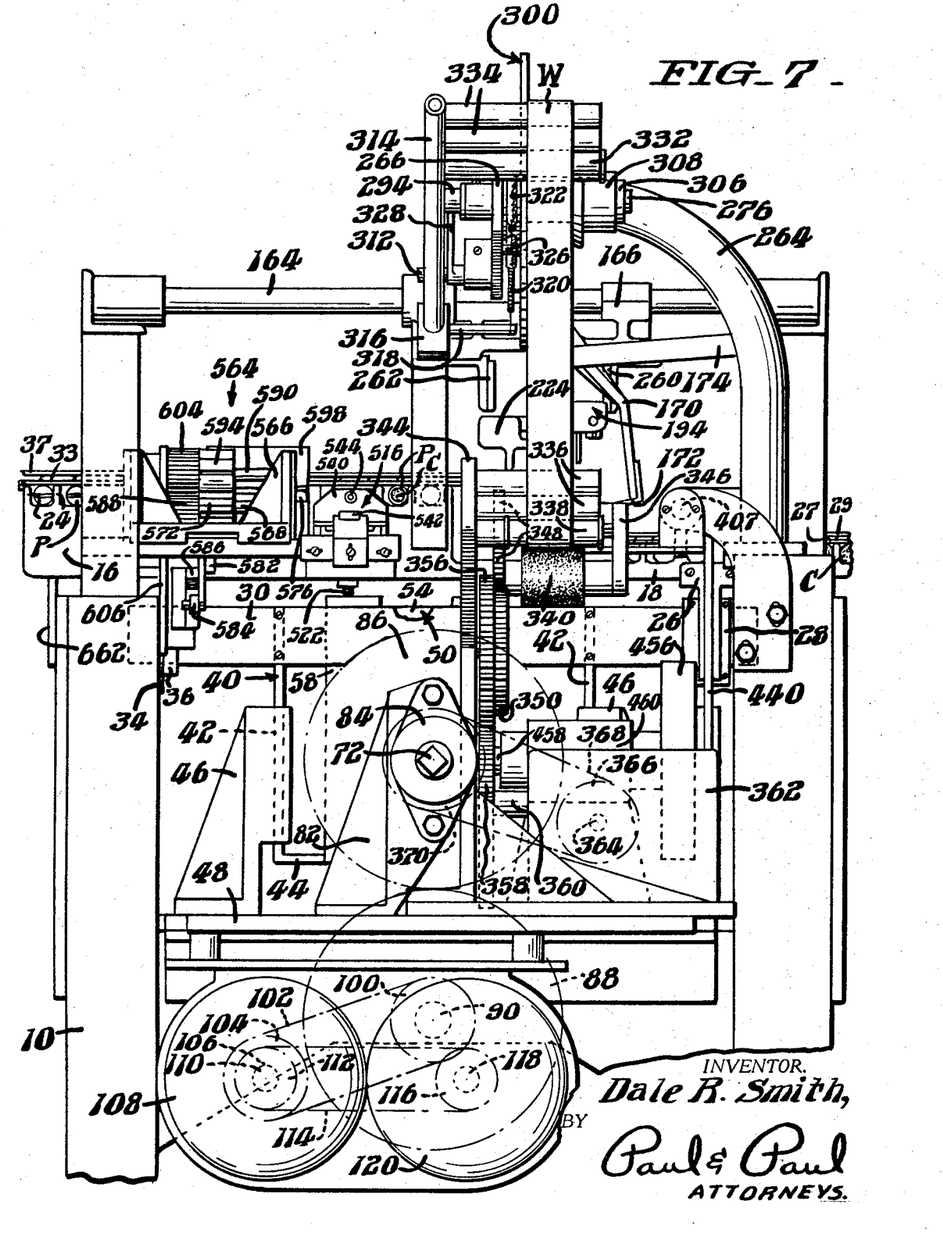
FIGURE 7 is a rear elevation of the machine.
Figure 8:
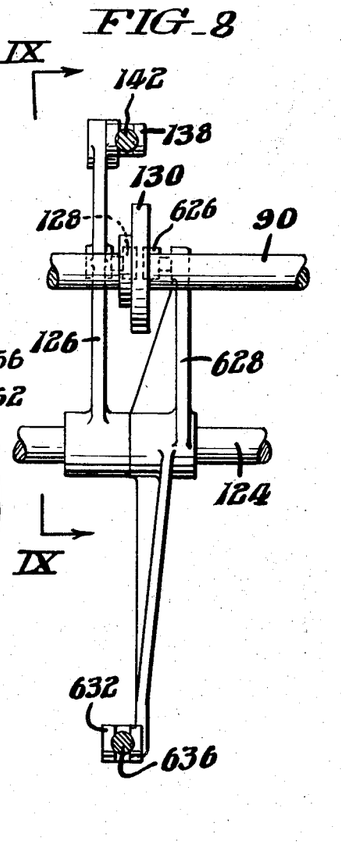
FIGURE 8 is a section on line VIII—VIII in FIGURE 14.
Figure 9:
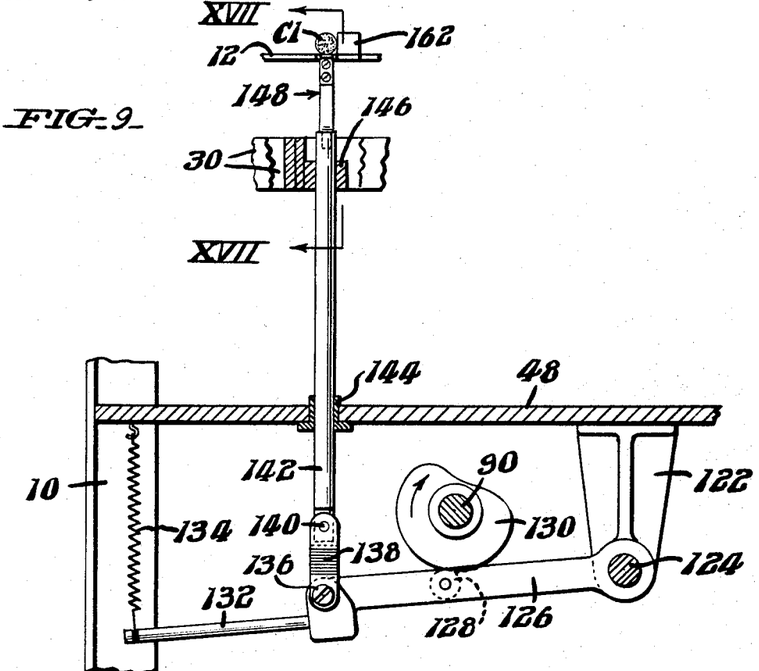
FIGURE 9 is a section on line IX—IX in FIGURE 8.
Figure 10:
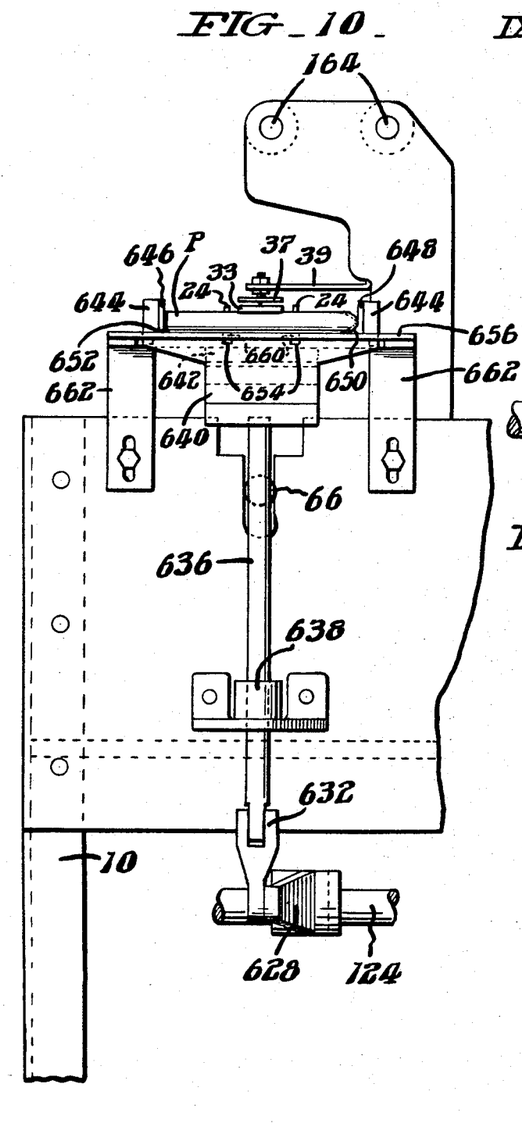
FIGURE 10 is a fragmentary end view of the machine, showing mechanism for effecting a longitudinal seal.
Figure 11:
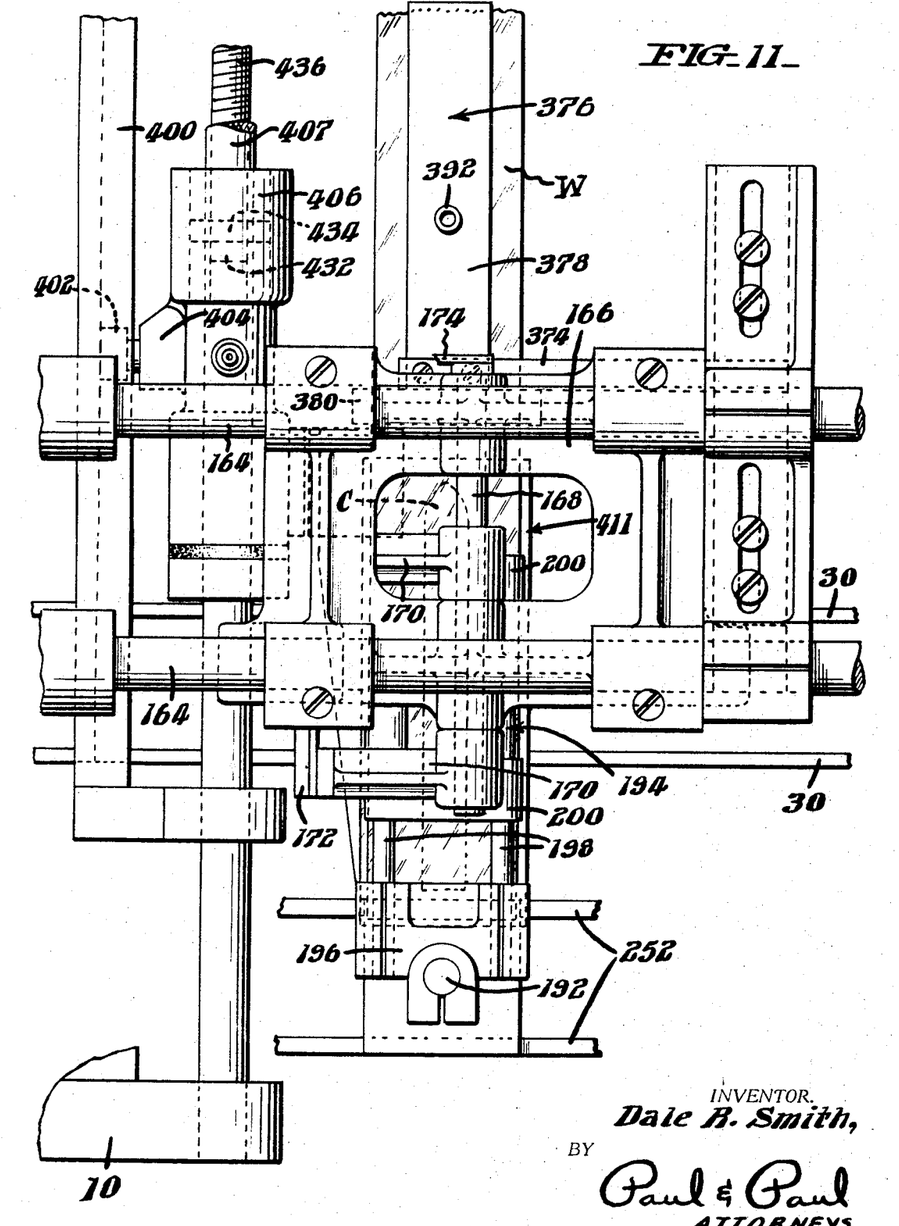
FIGURE 11 is a fragmentary plan view of the machine.

During the first one-quarter cycle of the machine, i.e., the first one-quarter turn of the shaft 72, the cam 70 moves frames 50 and 40 and the racks 16 downwardly from the position of FIGURES 1, 2 and 4 to that of FIGURE 5. Thus the fingers 20 are disengaged from the cigars on the infeed platform 12 and the fingers 24 are disengaged from the cigars on the discharge platform 14. During the second one-quarter cycle, the cam 70 moves frame 50 to the left. In addition, through screw 62 the racks 16 are moved to the left from the position of FIGURE 5 to the position of FIGURE 6. During the third one-quarter cycle, the cam 70 moves frames 50 and 40 and the racks 16 upwardly so that the fingers 20 or 24 initially behind any selected cigar C, as shown in FIGURES 1 and 2, will be positioned behind the next following cigar C. During the final one-quarter cycle, the cam 70 moves frame 50 to the right, and through screw 62 the racks 16 are moved to the right, back to their initial positions shown in FIGURES 1, 2 and 4. Thus each of the cigars C at the level of the infeed platform 12 is advanced to the position formerly occupied by the next preceding cigar C, the leading cigar C is advanced to a position over a cigar elevator, to be presently described, and (except for the three trailing cigars) each of the cigars C at the level of the discharge platform 14 is advanced to the position formerly occupied by the next preceding cigar C.

It will be noted that the racks 16 move in a rectangular pattern, that the cigars on the infeed and discharge platforms are held down by chains 25 and 33 and that they do not roll but slide along the platforms. In addition, it will be noted that racks 16 may be shifted horizontally relative to the cam follower frame 50 by manipulating the knob 66.

Referring particularly to FIGURES 1, 12, 14, 9 and 17, depending from the plate 48 are a pair of bearings 122 which support a pivot shaft 124. Pivoted on the shaft 124 is a lever 126 which mounts intermediate the opposite end portions thereof a roller 128 engaging a cam 130 mounted upon the drive shaft 90. Extending in longitudinal continuation of the lever 126 is a rod 132 to which is attached the lower end of a tension spring 134, the upper end of the spring being anchored to the plate 48. Pivoted to the free end of the lever 126, as at 136, is the lower end of a clevis 138, and pivoted to the upper end of the clevis 138, as at 140, is an upright rod 142 which extends through a sleeve 144 carried by the plate 48. The upper end portion of the rod 142 extends through a sleeve 146 which is carried by the plate members 30. Mounted upon the upper end of the rod 142 is the head of an elevator, generally designated 148. The head comprises a base portion 150 from which there extend upwardly a pair of sections 152 and a section 154 intermediate the sections 152. Extending outwardly in opposite directions from the sections 152 respectively are a pair of clip angles 156. Opposite side areas of the infeed platform 12 are recessed, as at 158, and intermediate the recesses 158 is an opening 160. The sections 152 and 154 extend upwardly through the recesses 158 and the opening 160 respectively, being flush with the upper surface of the infeed platform in order to support a cigar, as in FIGURE 17.

The leading cigar C on the infeed platform 12, disposed over the elevator head 148 and adjacent a stop 162, is raised to the level of the discharge platform 14 by the elevator 148. The shaft 90 rotates the cam 130, which oscillates the lever 126 and reciprocates the rod 142. The arrangement is such that during the first one-quarter cycle, while the racks 16 are moving downwardly from the position of FIGURES 1, 2 and 4 to that of FIGURE 5, the elevator moves upwardly from the position of FIGURES 1 and 2 to that of FIGURE 4 and returns to its initial position, as shown in FIGURE 5. Thus the cigar C1 is raised by the elevator 148 to the level of the discharge platform 14 and then relowered in time for receiving the next following cigar.

Referring particularly to FIGURES 2, 11, 16 and 18, carried by the frame 10 are a pair of laterally spaced horizontally extending bars 164 mounting a casting 166. Carried by the casting 166 is a horizontally extending pivot shaft 168 from which there depend a pair of laterally spaced arms 170 carrying an underfold plate 172. Affixed to one end of the pivot shaft 168 is a lever 174 to the free end of which is pivoted, as at 176, the upper end of a link 178. The lower extremity of the link 178 is pivoted, as at 180, to a lever 182. An intermediate portion of the lever 182 is carried by a pintle 184 mounted upon a bracket 186 depending from the plate 48. The opposite end of the lever 182 mounts a cam roller 188 which works in a cam track 190 formed in one side of the spur gear 88.

Shaft 90 rotates gear 88 and the roller 188 working in cam track 190 rocks lever 182. The lever 182 reciprocates link 178 which oscillates lever 174, shaft 168, arms 170 and plate 172 as a unit. Thus when the elevator 148 rises, plate 172 is in the position shown in FIGURES 1, 2, 4 and 6. When the elevator 148 begins to descend, the plate 172 moves in an arcuate path from the position of FIGURES 1, 2, 4 and 6 to the position of FIGURE 5 thereby to support the cigar C1 in its elevated position, i.e., at the level of the discharge platform 14.

Referring particularly to FIGURES 2, 4, 5, 6, 12 and 16, an upright standard 192 mounts an underfold assembly, generally designated 194. The assembly includes a block 196 affixed to the standard 192 and a pair of horizontally extending, laterally spaced rods 198. Affixed to the rods 198 are a pair of longitudinally spaced blocks 200 each having an upright flange 202. The flanges 202 carry opposite end portions respectively of a pair of laterally spaced shafts 204. The shafts 204 carry a pair of meshing gears 206. Each shaft also carries a pair of hubs 208 from which there depends a plate 210. Extending upwardly from one of the hubs 208 is an arm 212 carrying a roller 214. Extending upwardly from the other hub 208 is an arm 216 carrying a strike 218. The arms 212 and 216 are interconnected by a compression spring 220. Affixed to one of the rods 198 is a block 222 which carries a pair of auxiliary racks 224. Each rack has depending from the main body portion thereof a pair of fingers 228. The blocks 200 mount a yoke 230 slidable therein and provided at the lower extremities thereof with shoes 232. A pair of tension springs 234 bias the yoke downwardly.

Referring particularly to FIGURES 1, 11, 14 and 16, the lower extremity of the standard 192 is affixed to the top of a cam follower frame, generally designated 236. The frame 236 is provided with a large rectangular opening 238 defined by a horizontally extending upper member 240, laterally spaced upright opposite side members 242 and 244 and a horizontally extending lower member 246. The cam follower frame 236 is mounted in a frame 250, which is provided with an upper member in the form of a pair of horizontally extending plates 252, laterally spaced opposite side members 254 and a horizontally extending lower member 256. The members 254 are slidably received respectively in a pair of brackets 258 carried by the plate 48. Disposed within the square opening 238 of the frame 236 is a cam 248 of a shape for actuating and positively controlling movement of the frame. The cam 248 is mounted upon a shaft 263 journaled in a bearing 265 seated upon a block 267 carried by the plate 48. The shaft mounts a sprocket 269 over which is trained a chain 271. The chain is also trained over a sprocket 273 mounted upon the main drive shaft 90. The sprockets 269 and 273 are the same in size, in consequence of which the shaft 263 is rotated at the same rate and in the same direction as the shaft 90.

During the first one-quarter cycle, while the racks 16 are moving downwardly from the position of FIGURES 1, 2 and 4 to that of FIGURE 5, the cam 248 moves cam follower frame 236 and frame 250 downwardly. The standard 192 and assembly 194 move downwardly too. The strike 218 is engaged with a shoe 260 depending from casting 166 and through gears 206 holds the lower extremities of the plate 210 apart as the strike moves downwardly over the shoe 260 from the position of FIGURES 1 and 2 to that of FIGURE 5. The plates 210 straddle the cigar C1 which has been raised by the elevator 148 and which is now supported by the underfold plate 172 at the level of the discharge platform. At the same time, shoes 232, urged by springs 234, hold the cigar down on the elevator platform, and the fingers 228 of the auxiliary racks 224 move downwardly between cigars C1 and C2 and between cigars C2 and C3.

During the second one-quarter cycle, the cam 248 slides cam follower frame 236 to the right relative to the frame 250. Assembly 194 moves to the right too. Thus the cigars C1, C2 and C3 are advanced from the positions shown in FIGURE 5 to the positions shown in FIGURE 6. Cigar C3 moves into the empty space between cigar C3 and C4 shown in FIGURE 5. As assembly 194 moves to the right, the strike 218 disengages from the shoe 260, whereupon the spring 220 expands and causes the lower extremities of the plates 210 to firmly engage the opposite sides of the cigar. As the assembly 194 approaches the end of its traverse to the right, the roller 214 engages a shoe 262 depending from the casting 166, which causes the plates 210 to release the cigar against the influence of the spring 220.

During the third one-quarter cycle, the cam 248 moves cam follower frame 236 and frame 250 upwardly. Standard 192 and assembly 194 move upwardly too. Roller 214 moves upwardly over shoe 262, keeping the lower extremities of the plates 210 apart. Thus the plates 210 and the fingers 228 of the racks 224 disengage from the cigars. At the same time, shoes 232 release the cigar C1.

During the final one-quarter-cycle, the cam 248 slides cam follower frame 236 back to the left relative to the frame 250. Assembly 194 moves to the left, too. As assembly 194 moves to the left, the roller 214 disengages from the shoe 262, and the spring 220 again acts to bring the lower extremities of the plates 210 closer together. As the assembly 194 approaches the end of its traverse to the left, the strike 218 engages the shoe 260, and the lower extremities of the plates 210 are again spread apart against the influence of the spring 220. The assembly 194 is now back in its initial position.

It will be noted that assembly 194 moves in a rectangular pattern, and that the cigars do not roll but slide over the discharge platform. It will also be noted that the racks 16 and assembly 194 move horizontally at the same time but in opposite directions, and that they move vertically at the same time and in the same direction.

What is claimed is:

1. In means for advancing cigars through a cigar overwrapping and banding machine, the combination comprising an infeed platform, a discharge platform vertically spaced from said infeed platform, main finger bearing means disposed in a raised and extended position wherein each finger is disposed between a pair of said cigars, and mounted for being lowered from said raised and extended position whereby to withdraw said fingers from between said cigars, retracted horizontally from its lowered and extended position, raised from its lowered and retracted position for reinsertion of said fingers between said cigars, and extended horizontally from its raised and retracted position to its initial raised and extended position whereby to advance said cigars, means for actuating said finger bearing means in repeating cycles to advance each cigar successively from finger to finger over said platforms, and means for transferring each successive cigar from said infeed to said discharge platform including means for receiving the cigar from said infeed platform and carrying it to the level of said discharge platform, and means for moving the cigar from said cigar carrying means onto said discharge platform, said transfer means being operable in predetermined timed relation to said finger bearing means whereby to coact therewith for advancing said cigars in a steady stream thereof through said machine.

2. The combination according to claim 1 wherein the finger bearing means comprises a pair of horizontally extending racks disposed respectively upon opposite sides of the infeed and discharge platforms and each of a length substantially corresponding to the combined overall length of the infeed and discharge platforms, the corresponding sections of said racks at the infeed end of said machine being provided with integral fingers extending upwardly above said infeed platform, and the corresponding sections of said racks at the discharge end of said machine being provided with integral fingers extending upwardly above said discharge platform.

3. The combination according to claim 1 wherein the discharge platform is at an elevation substantially higher than that of the infeed platform, the means for moving the cigars from the cigar carrying means onto the discharge platform includes cigar engaging means disposed in a raised and retracted position and mounted for being lowered from said raised and retracted position to engage a cigar raised from said infeed platform to the level of said discharge platform, extended horizontally from its lowered and retracted position to move the cigar from a position over said cigar carrying means onto said discharge platform, raised from its lowered and extended position for withdrawing from said cigar, and retracted horizontally from its raised and extended position to its initial raised and retracted position, and means for actuating said cigar engaging means in repeating cycles to move each cigar successively from a position over said cigar carrying means onto said platform.

4. The combination according to claim 3 wherein the cigar engaging means includes a pair of members disposed for receiving the cigar therebetween and adapted to automatically close thereon and hold the same when the cigar moving means commences to move in cigar advancing direction and to automatically release said cigar as the cigar moving means approaches the end of its traverse in cigar advancing direction.

5. The combination according to claim 4 wherein the pair of members disposed for receiving the cigar therebetween are mounted for pivotal movement simultaneously in opposite directions, and means is provided for yieldably urging the corresponding free end portions of said members toward each other, and for releasably holding said members, against the influence of said yieldable means, with said corresponding free end portions apart.

6. The combination according to claim 1 wherein the discharge platform is at an elevation substantially higher than that of the infeed platform, the means for moving the cigars from the cigar carrying means onto the discharge platform includes cigar engaging means disposed in a raised and retracted position and mounted for being lowered from said raised and retracted position to engage a cigar raised from the infeed platform to the level of said discharge platform, extended horizontally from its lowered and retracted position, raised from its lowered and extended position for withdrawing from said cigar, and retracted horizontally from its raised and extended position to its initial raised and retracted position, auxiliary finger bearing means mounted for being lowered, horizontally extended, raised and horizontally retracted to its initial position with said cigar engaging means, means for actuating said cigar engaging means and auxiliary finger bearing means in repeating cycles to move each cigar successively from a position over said cigar carrying means onto said discharge platform and to a position on said discharge platform for being engaged by the fingers of the main finger bearing means.

7. The combination according to claim 6 wherein the auxiliary finger bearing means includes a pair of horizontally extending racks disposed respectively upon opposite sides of the discharge platform and provided with fingers extending downwardly to approximately the level of said discharge platform when said auxiliary finger bearing means is in lowered position.

8. The combination according to claim 6 wherein the means for moving the cigar from the cigar carrying means onto the discharge platform is extended horizontally when said main finger bearing means is retracted and retracted horizontally when said main finger bearing means is extended, and said means for moving the cigar from the cigar carrying means onto the discharge platform and said main finger bearing means are raised and lowered together.

9. The combination according to claim 1 wherein the discharge platform is at an elevation substantially higher than that of the infeed platform, the means for carrying the cigar to the level of the discharge platform is raised and relowered while the fingers of the main finger bearing means are being withdrawn from the cigars, and means is provided for holding the cigar at the level of the discharge platform after the cigar carrying means is relowered.

References Cited

FOREIGN PATENTS 349,920  10/1960  Switzerland.

EDWARD A. SROKA, *Primary Examiner.*